United States Patent
Knaebchen et al.

(10) Patent No.: US 7,457,627 B2
(45) Date of Patent: Nov. 25, 2008

(54) TRANSFER OF INFORMATION IN A COMMUNICATION NETWORK WITH A VERIFIED QOS

(75) Inventors: Andreas Knaebchen, Munich (DE); Rainer Liebhart, Schrobenhausen (DE)

(73) Assignee: Siemens Aktiengesellschaft, Munich (DE)

( * ) Notice: Subject to any disclaimer, the term of this patent is extended or adjusted under 35 U.S.C. 154(b) by 507 days.

(21) Appl. No.: 10/471,456

(22) PCT Filed: Jan. 30, 2002

(86) PCT No.: PCT/EP02/00967

§ 371 (c)(1),
(2), (4) Date: Mar. 12, 2004

(87) PCT Pub. No.: WO02/073929

PCT Pub. Date: Sep. 19, 2002

(65) Prior Publication Data
US 2004/0142697 A1 Jul. 22, 2004

(30) Foreign Application Priority Data
Mar. 13, 2001 (EP) .................................. 01106137

(51) Int. Cl.
*H04Q 7/20* (2006.01)
(52) U.S. Cl. .................... 455/452.2; 455/405; 455/406; 455/410
(58) Field of Classification Search ......... 455/405–406, 455/411, 422.11, 454, 452.2, 410; 709/223; 370/468
See application file for complete search history.

(56) References Cited

U.S. PATENT DOCUMENTS

| 6,661,806 B1* | 12/2003 | Eriksson et al. ............. 370/468 |
| 2004/0172464 A1* | 9/2004 | Nag ........................... 709/223 |
| 2005/0026621 A1* | 2/2005 | Febvre et al. ............... 455/450 |
| 2005/0186933 A1* | 8/2005 | Trans .......................... 455/296 |

OTHER PUBLICATIONS

Gary A. Thom, H.323: The Multimedia Communications Standard for Local Area Networks, Dec. 1996, IEEE Communications Magazine.*

* cited by examiner

*Primary Examiner*—Duc Nguyen
*Assistant Examiner*—Dai A Phuong
(74) *Attorney, Agent, or Firm*—Baker Botts L.L.P.

(57) ABSTRACT

In a communication network, which includes a call control level CCL, a resource control level RCL and at least one terminal A assigned to data transfer, a QoS requirement RQ determined for a data transfer is verified at expense at call control level CCL. An encrypted token T is then created from this and transferred via terminal A to resource control level RCL. This latter verifies an incoming QoS requirement RQ from terminal A only by means of the encrypted token T. If successful, the communication network is configured so that the data is transferred with the QoS verified according to the invention. The invention allows the efficient, secure and correct provision of QoS in integrated voice and data networks. In particular extensive modifications to existing routers are avoided at resource control level RCL. The regularly repeated transfer of tokens T also supports consistent termination of the QoS provided and secure and correct billing of the data transfer.

12 Claims, 3 Drawing Sheets

TRANSFER OF INFORMATION IN A COMMUNICATION NETWORK WITH A VERIFIED QOS

CLAIM FOR PRIORITY

This application claims priority to International Application No. PCT/EP02/00967, which was published in the German language on May 22, 2003, which claims the benefit of priority to European Application No. EP 01106137.1 which was filed in the German language on Mar. 13, 2001.

TECHNICAL FIELD OF THE INVENTION

The invention relates to a method, computer program product, terminals and configurations for the transfer of data with a verified QoS (quality of service) in a communication network.

BACKGROUND OF THE INVENTION

In the past two key types of communication network have evolved for the transfer of data: packet-orientated data networks and line-orientated voice networks. These could be distinguished by their different QoS and security requirements, for example.

QoS or quality of service can be defined in different ways depending on context and is therefore evaluated using different systems. Known examples of systems for measuring quality of service are the quantity of data transferred (bandwidth), the quantity of data not transferred (loss rate), the—where applicable mean—time delay in the transfer (delay), the—where, applicable mean—deviation from the otherwise standard interval between two data transfers (delay jitter) or the quantity of data, the transfer—of which is not permitted (blocking rate).

Security covers, for example, the authentication and authorization of the parties and the integrity and confidentiality of the transferred data. Authentication here is the positive identification of the sending party, authorization is the allocation of entitlements, integrity is the guarantee of uncorrupted data and confidentiality is the encryption of data, so that third parties cannot understand its content.

With regard to encryption, a distinction is made between symmetrical and asymmetrical encryption. Symmetrical encryption methods can be coded and decoded significantly faster compared with asymmetrical methods. With symmetrical encryption, the sender and recipient generally share a joint secret also known as a key—which can be used to encode and decode the encrypted data. With asymmetrical encryption, each party has a private secret or key, for which a public key is generated. If data is encoded by a sender using a recipient's public key, it can only be decoded by the recipient using the latter's private key. This ensures the confidentiality of the transferred data, as only the recipient can decode the data. Alternatively, data can also be encoded with the sender's private key and decoded by any recipient using the sender's public key. This means that the sender is securely authenticated, as decoding is only successful if the data has been encoded with the private key known only to the sender. This procedure is known as the (digital) signature. So-called "certificates" according to the ITU standard X.509 are also used here. These are public keys for a party, as certified by a trust centre or a certification authority. Certificates are sometimes also transferred in-band, for example, if the communication partners do not yet know the partners' certificates or to speed up processing.

State monitoring or lawful interception, as may be instituted by government regulatory bodies and/or the courts, for example when investigating crimes, is an exception to the principle of confidentiality through encryption. A top quality security concept must provide a means of countermanding an existing confidentiality mechanism, to allow government-instituted monitoring. This may be achieved, for example, by disclosing the key used. In this context, key recovery refers to the reconstruction of a lost key, while the use of a key, for example for state monitoring by an authorized, reliable third body, is referred to as key escrow.

Line-orientated voice networks are designed for the transfer of a continuous stream of (voice) data referred to in the trade as a "call" or "session". Here data is generally transferred with a high level of quality and security. For example, for voice it is important to have a minimal—e.g. <200 ms—delay with no fluctuations in delay time (delay jitter), as voice requires a continuous data stream for reproduction in the receiver. Data loss can therefore not be compensated by a repeat transfer of the data not transferred and generally results in an acoustically perceptible crackle in the receiver. In the trade, the transfer of data is also generally also described as a realtime (transfer) service. The quality of service is achieved by appropriate dimensioning and planning of the voice networks, with the transfer capacity itself not subject to fluctuations in principle because of their line-orientated nature. Security is ensured, for example, by appropriate spatial and organizational isolation of the voice networks against unauthorized third parties. In the past, for example, the responsibility for voice networks frequently lay with the government, which meant that monitoring by third parties could largely be excluded.

Packet-orientated data networks are designed for the transfer of packet streams, also known in the trade as "data packet streams". Generally, a high level of service quality does not have to be guaranteed for this. Without guaranteed quality of service the data packet streams are transferred, for example, with delays, which fluctuate over time, as the individual data packets in the data packet streams are usually transferred in the sequence in which they access the network, in other words the time delays increase the more packets the data network has to transfer. In the trade, the transfer of data is therefore described as a non-real time service. Security plays a secondary role. In smaller networks, for example, local networks (LAN) or corporate networks (also known as virtual private networks (VPN)) it is usually achieved by spatial isolation of the networks, as there are only parties with prior entitlement in these networks (known as "friendly users").

The best known data network at present is the internet. The internet is designed as an open (long distance traffic) data network with open interfaces to link (generally local and regional) data networks from different manufacturers. The main focus to date has therefore been on providing a manufacturer-independent transport platform. Adequate mechanisms for guaranteeing quality of service and security playa secondary role. At present better security is achieved primarily by means of decentralized filter devices located at the interfaces with the internet, known as firewalls. Network-internal quality of service and security mechanisms scarcely exist however. Key recovery and key escrow in particular are unknown in the known IF-based voice and/or data networks.

With the convergence of line-orientated voice and packet-orientated data networks, voice transfer services and in future also broader band services, such as animated image data transfers, will also be provided in packet-orientated data networks, in other words realtime services which were generally transferred using a line-orientated system until now will be transferred in a packet-orientated system in a convergent voice-data network, in other words in packet streams. These are also referred to as "realtime packet streams". The problem then arises that a high level of quality of service and security is required for the packet-orientated provision of a realtime service, so that the quality is comparable to a line-orientated transfer, while modern data networks and in particular the internet do not provide adequate mechanisms to guarantee a high level of quality of service and security (for a definition of service dependent QoS classes, see also ITU standard H.323—Annex N, Draft (February 2000), "End to end QoS control and signaling in H.323 systems", Temporary Document 126 Rev1 (ID126rev1.doc), Study Group 16, Geneva, Feb. 2-Feb. 18, 2000, Appendix V, chapter 10.x.2.4, table 2).

The intention now is to focus on voice transfer on the internet. This does not represent any significant restriction, as the quality of service and security requirements are not specifically for the internet but apply generally to all types of data network. They do not depend on the specific configuration of a data network. The packets may therefore be in the form of internet, X.25 or frame relay packets or even ATM cells. Sometimes they are also described as "messages", primarily where a message is transferred in a packet. Data packet streams and realtime packet streams are therefore embodiments of traffic flows transferred in communication networks. Traffic flows are also described as "connections", even in packet-orientated networks, in which connectionless transfer technology is used. For example data transfer with TCP/IP takes place using what are known as flows, by means of which the sender and recipient (e.g. web server and browser) are connected at a logically abstract level, despite the connectionless nature of IP, in other words, flows also represent connections in a logically abstract way.

A number of architectures have been described for the transfer of voice and image data via a packet-orientated IP network (e.g. the internet)—also known as "V oIP"—in the international standardization committees IETF (InternetEngineering Task Force) and ITU (International Telecommunications Union). The fact that call control level and resource control level are functionally separate is common to all.

Call control level includes an (optional) call controller, to which the following functions are assigned among others:

Address translation: conversion of E.164 telephone numbers and other alias addresses (e.g. computer names) to transport addresses (e.g. internet addresses).

Admission control (optional): basic admission check, whether and to what extent (e.g. VoIP compatible) devices may use the communication network.

Bandwidth control (optional): management of transfer capacities.

Zone management: registration of (e.g. VoIP compatible) devices and provision of the above functions for all devices registered with the call controller.

As an option, a call controller may also be assigned the following functions, as required:

Call control signaling: all signaling messages are transferred by at least one call controller, in other words all devices send and receive signaling messages only via the call controller. The direct exchange of signaling messages between the devices is prohibited.

Call authorization: admission check for incoming and outgoing calls.

Bandwidth management: control of the permitted number of devices which may use the communication network at the same time.

Call management: management of a list of ongoing calls, for example to be able to generate an engaged signal, if this cannot be generated by the device itself.

Alias address modification: return of a modified alias address, e.g. with an H.225.0 ACF (admission confirmation) message. The terminal must use this address when setting up a call.

Dialed digital translation: conversion of the dialed numbers into an E.164 telephone number or a number from a private numbering system.

The matter of a bandwidth reservation made by the call controller for devices which cannot carry out this function themselves has at present been left open and is "for further study" (see H.323 Draft v4 (July 2000), ch. 6.4).

Examples of call controllers are the gatekeeper proposed by the ITU in the H.323 standard family or the SIP proxy proposed by the IETF. If a larger communication network is divided into a number of domains—or zones—a separate call controller may be provided in each domain. A domain may also be operated without a call controller. If a number of call controllers are provided in one domain, only one of these should be activated. For logical reasons, a call controller should be seen as separate from the devices. Physically however it does not have to be in a separate call controller device but may also be provided in any terminal of a connection (for example configured as an H.323 terminal: terminal, gateway, multipoint control unit, etc.) or even of a device configured primarily for program-controlled data processing (for example: computer, PC, etc.). A physically distributed system is also possible.

Resource control level includes as its central element a resource controller, to which the following functions are assigned, among others:

Capacity control: control of the traffic volume supplied to the communication network by packet streams, e.g. by controlling the transfer capacity of individual packet streams.

Policy activation (optional): where appropriate, for a prioritized packetstream, reserve resources in the communication network for its transfer.

Priority management (optional): apply, check and, if necessary, correct priority flags in the packets on the basis of the priority of their packet streams, if the packets are already flagged with priorities.

The resource controller is also described as the "policy decision point" (PDP). It is frequently provided in what are known as "edge routers"—also referred to as "edge devices", "access nodes" or when allocated to an internet service provider (ISP), the "provider edge router" (PER). Alternatively the PER may only function as a proxy and route data relevant to the resource controller to a separate server, on which the resource controller is located.

The collaboration in principle between call controller and resource controller according to the protocols of the IETF and ITU (see H.323 Draft v4 (July 2000), Appendix IT) is to be explained using the example of a call set-up between two VoIP devices configured as user terminals.

Within or to some extent also before the actual call set-up, the stages authentication, authorization and (start of) accounting take place when a terminal dials into the IP network (e.g. via an internet service provider). This so-called AM functionality is generally achieved by access to a subscriber database, in which all users are stored with their IDs, passwords, authorizations, etc. Such access is slow and comparatively complex. In the current "best effort" IP networks this AAA procedure generally takes place once, as the user dials in. Further authentication takes place when a call controller is used, when the terminal registers with the call controller (e.g. an SIP proxy or an H.323 gatekeeper) of the internet service provider. According to the H.323 Draft v4 (July 2000), this authentication or registration of a terminal with the assigned gatekeeper is carried out according to the RAS (registration, admission, status) protocol. The RAS protocol is described in the ITU standard H.22S.0. This also provides a mechanism, by means of which an initiated registration lapses after a certain time and only continues, if it is renewed within the required period (see, for example, H.22S.0 (February 1998), ch. 7.9.1 and 7.9.2, timeToLive parameter in the registration confirm RCF message to set the duration of the registration period and keepAlive parameter in the registration request RRQ message to renew or in other words extend the period of an existing registration).

The actual call set up generally starts with the parties, terminals exchanging their capabilities (e.g. list of supported codecs) in a first stage, in order to determine the necessary resources (e.g. bandwidth) and the required QoS (e.g. delay, jitter). In the case of voice telephony, the terminals are configured, for example, as IP telephones, in the case of online video, one of the terminals would be a content or application server, e.g. in the network of the internet service provider (ISP).

The exchange of signaling messages takes place either directly between the terminals or relayed by a call controller. With each call it is established individually for each terminal and each transfer device, which variant is in operation. The first variant is described, for example, in the H.323 Draft v4 (July 2000) as direct endpoint call signaling and the second as gatekeeper routed call signaling. In the case of direct endpoint call signaling, copies of selected signaling messages can be routed to a call controller as necessary. This means that a call controller frequently has knowledge of the resource and QoS requirements coordinated between the terminals. These requirements are however not influenced or verified actively by it.

In a second, optional stage, the resource and QoS requirement coordinated in this way can be transferred directly from the parties' terminals to their assigned resource controller. After verifying the resource and QoS requirement, the resource controller sends back a confirmation (or rejection) to the terminal.

In a third, also optional stage, a policy is activated in the edge router and, if necessary, other routers in the network, which these routers use to verify and guarantee that the traffic generated by the terminal is within the limits specified in the requirement. One example of such a reservation mechanism is RSVP (Resource reSerVation Protocol).

A number of messages are sent to carry out the three stages, which are only to coordinate the components involved with each other, not to transfer the actual data between the terminals. This data transferred with the messages is generally described as "signaling information", "signaling data" or just "signaling". The concept is broad. In addition to the signaling messages, it includes messages according to the RAS protocol, messages according to the ITU standard H.245 to control channels used by ongoing calls and all other similarly configured messages. The signaling protocol for call set-up and call release according to the ITU is described, for example, in the standard H.225.0, "Media stream packetization and synchronization on non-guaranteed QoS LANs", 2000, according to the IETF in RFC 2453a, "SIP: Session Initialization Protocol", draft-ietf-sip-rfc2453bis-02.txt, September 2000. The actual data is also called "useful data", "media information", "media data" or just "media" to distinguish it from signaling.

In this context, out-of-band is used to refer to the transfer of data (e.g. keys) on another channel/medium apart from the channels provided in the communication network for the transfer of signaling and useful data. In particular this covers a local configuration of local devices, with a local control device, for example. In contrast, data is transferred in-band on the same channel/medium, where necessary separated logically from the signaling and useful data in question.

Call set-up here refers overall to the establishment of the (transport) connection, signaling for the call, where necessary security and other handshakes and the start of the (voice) data transfer. In the ITU standard H.323 a fast, efficient call set-up is also described with short delays, short roundtrip times with the fewest possible additional flows or handshakes as "fast connect".

The above shows that implementation of VoIP is only accepted subject to the following conditions:

It is important for the party that the associated signaling data and the media data in voice form are transferred in the integrated voice/data network with the same quality of service (QoS) as in the voice network.

It is important for the network operator that the transferred calls are billed with the same security and quality as in the voice network.

The matter of a bandwidth reservation by the call controller for devices which cannot implement this function themselves has been left open and is "for further study" for the present (see H.323 Draft v4 (July 2000), ch. 6.4)–the aspect of secure billing is not covered. As part of the study work on QoS, a mechanism for QoS control with the following features is disclosed in the ITU standard H.323-Annex N, Draft (February 2000), "End to end QoS control and signaling m H.323 systems", Temporary Document 126 Revl, (TD126revl.doc), Study Group 16, questions 13/16 and 14/16, Geneva, Feb. 2-Feb. 18, 2000:

the terminals are able to display QoS requirements both for outgoing and incoming media streams (Annex N Draft (02/2000), ch. 3.2, point 1).

Either the terminals display a QoS requirement for each call or the QoS requirement is input beforehand by the service provider and can as an option be overwritten for each call with a separate QoS requirement (Annex N, Draft (February 2000), ch. 3.2, point 2).

So-called user-specific QoS profiles can be registered with the gatekeepers. These are used to authorize a QoS requirement, by determining the QoS levels, which a specific user may request, for example, on the basis of its contract with a specific service provider (Annex N, Draft (February 2000), ch. 3.3, point 1).

The gatekeepers should be able to determine whether the QoS requirement of a terminal can be satisfied (Annex N, Draft (February 2000), ch. 3.3, point 3).

The gatekeepers should be able to activate the ability of the transport network to support QoS requirements by (direct) communication with the QoS mechanisms of the transport network (in other words resource control level); also to instruct transport networks to set up specific calls according to predefined QoS requirements; to make available appropriate authorization. It is explained in a footnote by the editor that indirect control by the gatekeeper by means of a terminal would be an alternative approach, which might be worth considering. No further details are however given of what nature of control is meant here, nor is there any indication of how this indirect control could be configured (Annex N, Draft (February 2000), ch. 3.3, point 6).

The gatekeeper should determine here whether the QoS requirement for a terminal is within the limits of its QoS profile and issue or refuse authorization to set up a call on this basis (Annex N, Draft (February 2000), ch. 3.3, point 7).

The H.323 mechanism for QoS control contains the following function units: End Point QoS Entity (EPQoSE) to request a desired QoS level; QoS Policy Entity (QoSPE) to manage policies and to authorize QoS levels; QoS Service Manager (QoSM) to transfer QoS requirements according to the policy determined by the QoSPE; Resource Manager (RM) for the application of a quantity of policies and procedures to a quantity of transport resources with the object of ensuring that the resources assigned by this means are adequate to guarantee the required QoS within the domain under the control of the RM (Annex N, Draft (February 2000), ch. 4.3).

EPQoSE is located within terminals, QoSM and QoSPE within H.323 domains and RM within transport domains. EPQoSE, QoSM and QoSPE are assigned to call control level, RM to resource control level. The interrelationship between these function units provides for a central QoSM, with which EPQoSE, QoSPE and RM each have a bilateral relationship. There are however no direct relationships provided between EPQoSE, QoSPE and RM (Annex N, Draft (February 2000), ch. 4.3, FIG. 3).

However the following problems arise with the technical conversion to an integrated voice/data network, like the internet for example, which were not or were inadequately resolved to date in both the standards and drafts of the IETF and/or ITU, nor in known implementations:

P1. How can the PER (RC, PDP) carry out the authentication and authorization of the resource and QoS requirement efficiently, even though the requirement is submitted dynamically for each call and user? This is exacerbated by the fact that reservation in the PER and other routers is generally soft, in other words it has to be renewed at regular intervals (measured in seconds), for example by sending the requirement to resource control level again. Authentication and authorization mechanisms, which are tailored very specifically to an application or a user or require a great deal of computing time in the PER (RC, PDP, etc.) are eliminated from the start (scaling problems, realtime problems). The PER and other ISP routers currently have no user-related data and will not have this in future either, as the task assigned to them essentially comprises routing IP packets and prioritizing policies accordingly.

P2. How can authentication and authorization be carried out so securely that billing can be based on them (in the voice network, the billing model is based wholly or partially on reserved resources, regardless of their actual utilization)? Security requirements are significantly fewer, if just the entire resource reservation is to be checked, to prevent network overload. Security is also required, as both users involved in the call dispatch resource and QoS requirements, but possibly only one of the two is to be billed.

P3. When using a call controller, how can it be guaranteed that the users' terminals dispatch the correct resource and QoS requirements, i.e. those confirmed by the call controller, to resource control level? The terminals involved in the call could dispatch any requirements due to abuse or technical misconduct!

P4. How is the consistent termination of the resource and QoS requirements of both terminals guaranteed, even though they generally address completely different PERs? So, for example, even though the party making and paying for the call has terminated the call, the called party for its part could maintain the reservation to its gateway and download more data from a server, giving a different IP address. The gateway could include this data in the previous call and bill for it, where applicable, if billing is based on the quantity of data transferred, for example. This is already a problem for two PERs of an ISP and it becomes even more problematic in interdomain instances with PERs belonging to different ISPs.

It is clear that a solution to this problem is essential for the practical viability of the concepts proposed by IETF and ITU and that it significantly determines the network architecture.

The above problems have not been adequately resolved to date (in other words with approaches which are as generic as the architecture concepts themselves). Either proprietary solutions are used, which cannot be applied generally, as they require network elements from a specific manufacturer, for example, or problems P1-P4 are sidestepped by restrictions in the flexibility, dynamics or operational capability of resource reservation and QoS guarantees. In certain conditions the above problems do not occur, for example in smaller corporate networks, in which users can be assumed to be "friendly", with prior entitlements (in other words no authentication or authorization), using the IP network for the intended purposes (in other words no policing) and not having to be billed on the basis of internal charges for network costs, for example (in other words no accounting).

A proprietary approach is followed, for example, in the EU Aquila project: users have an application on their terminals (e.g. a PC), which can be used to register the resource requirement. The resource requirement is processed by a specific RC server in the network, which determines the entitlement of the user (authentication and authorization) by means of a database search. Disadvantages of this are the proprietary application and the additional database search, which is generally very slow and a drain on the dynamics, and either requires further access (as well as when the user dials in) to the AAA database of the ISP (representing an unwanted security risk, if the ISP and call controller operator are not identical) or requires a second database, which should be consistent with the AAA database. It is also disadvantageous for the data of the call controller to have to be correlated with the data from the RC server during post-processing for billing purposes. Hot-billing (i.e. billing data during the call) is therefore excluded. Secure user authentication also only takes place once during the first reservation, as the operation subsequently continues with a static policy in the PER. This deviates from the principle of soft reservation in the routers, as proposed by the IETF with the RSVP protocol. This approach therefore leaves problems P1, P3 and P4 unresolved.

The company QoS Networks, Dublin, Ireland, currently operates a QoScompatible IP network. In this, policy adjustments are carried out statically by the ISP (so there is no dynamic reservation of resources). This is an acceptable proposition for corporate customers, as the resource requirement can be clarified within the company, the requirement profile is approximately constant over time, due to aggregation of all the company traffic, and user authorization is not required, as only company employees have access to the network. For ISPs who want to offer QoS-compatible networks to private customers or SOHO (Single Office Rome Office) customers, this is however not a solution. Problems P1 to P4 remain unresolved, as corresponding restrictions in this specific business model are not particularly disadvantageous or do not offer a technical solution.

The object of the invention is to find an adequate solution to at least one of the problems P1 to P4. This object is achieved by the features of claim 1.

A number of advantages are associated with this solution:

A further complex and dynamically demanding authentication and authorization of the QoS requirement at resource control level is not required, as according to the invention this is achieved using decrypted tokens. User databases do not have to be replicated and do not have to be designed for the processing of additional, periodic searches. Joint ownership of a secret at call control level and resource control level allows the use of a symmetrical encryption method. These methods are dynamically significantly faster than asymmetrical methods. To summarize, it is clear that the invention in itself is very efficient. The secret exists irrespective of a specific user, a specific call, a QoS requirement or subsequent periodic renewal requests. The administrative costs of secret management are therefore minimal and do not increase with the number of ISP users. The inclusion of a standard operation encryption method at call control level (e.g. gatekeeper) and resource control level (e.g. PER) is technically simple. This means that the management and implementation of devices (call controller, resource controller) and configurations according to the invention are also efficient—problem P1.

Use of an encryption method for encrypting and decrypting the tokens is not only technically but also legally secure. When the requirement is sufficiently well encrypted, billing can also take place—problem P2.

As the QoS requirement verified at call control level is taken into account when creating the encrypted token and is therefore known to resource control level after decryption of the token, when it is taken into account correspondingly (e.g. integration of the verified QoS requirement or at least significant parts of the verified QoS requirement) falsification of the requirement transferred between the terminals and the requirements actually dispatched by the terminals can advantageously be excluded without actual additional cost (i.e. efficiently). The QoS requirement is therefore also correct—problem P3.

The solution complies fully with the standard, it requires no additional proprietary protocols or messages. The invention is generically and conceptually interoperable, as it is independent of any specific solution. It can be used both on H.323 networks and on SIP networks. This makes the invention a comprehensive solution both in the case of H.323 and of SIP. This is important and therefore particularly advantageous, since, as has been proven in the past, the market is not very receptive to manufacturer specific solutions.

The encryption method must only be selected as standard for call control level and resource control level. The terminals are not affected. The solution therefore allows interoperability with different applications on the user terminal.

The encryption method can be improved (new method, longer key, more stringent legal requirements, etc.), as an ISP only carries out updates on its PER (RC, PDP, etc.) and call controller (in some cases held by another company). Advantageously the terminals and applications operating on them are again unaffected by this.

According to one embodiment of the invention, a token is transferred repeatedly, in particular repeatedly at regular intervals of seconds, by call control level to the terminal and forwarded from there to resource control level. In particular data of variable value is incorporated in the encrypted token—in particular a random number and/or a time stamp. If the QoS requirement is extended at call control level to include a dynamically specified random number, then advantageously any renewal message can also be encrypted or decrypted with the same key. If a time stamp is added to the encrypted QoS requirement, then it is advantageously ensured that the terminal cannot delay or store this verified requirement to forward it at a later time (fraud consideration: during the night, when lower tariffs apply, encrypted requirements are collected, which are used during the day at high tariffs). It is particularly advantageous that further maintenance of the (soft) reservation by one of the terminals is excluded, when the other has terminated the data transfer. In this case no further tokens are dispatched from call control level. The PER of an ISP and the other routers in the network will then cancel (terminate) the resource reservation required for a data transfer with the guaranteed QoS. A particular advantage here is that for this consistent termination, resource control level does not need any knowledge of the applications which generate the IP traffic from or to the terminals (example: while surfing the internet, the user makes an IP telephone call. The routers do not know beforehand when special resources have to be reserved for realtime voice traffic and when best effort suffices for the user)—problem P4.

Good advantages are also associated with the transfer of encrypted tokens between the terminal and call control level and/or between the terminal and resource control level in existing signalling messages, in particular KeepAlive messages and messages to renew the QoS requirement. If existing (signalling/reservation) reports are used, no new messages occur in the network. Also the additional encrypted requirements have no impact on network elements (transparency), which are not part of this technology: as before, these only respond to the original part of the reports (interoperability with legacy network elements).

Particularly good advantages result if call control level starts accounting for data transfer on successful verification of the QoS requirement and where necessary accounting and the transfer of encrypted tokens to the terminal are terminated on completion of the data transfer. As call control level controls the start and also the end of the call (triggered by terminal actions, e.g. replacement of the telephone handset), billing can not only be secure but also accurate with regard to time—see also problem P2.

The invention is distinguished by a particularly efficiency, when encryption and decryption are achieved using a symmetrical secret, in particular a symmetrical key

BRIEF DESCRIPTION OF THE DRAWINGS

The invention is described in more detail below using embodiments as shown in the figures. These show.

DETAILED DESCRIPTION OF THE INVENTION

Figure 1:
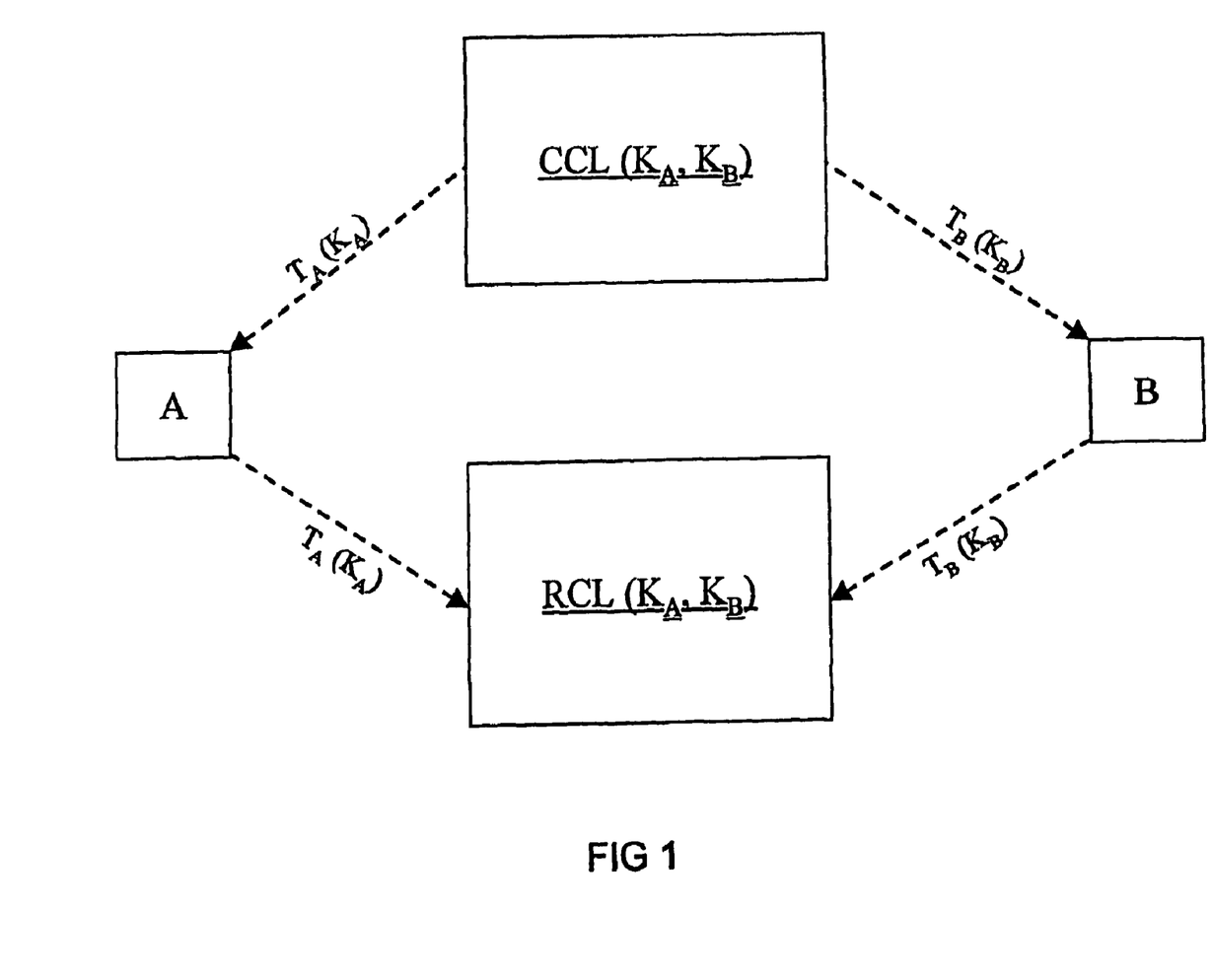
FIG. 1 a system for implementing the method according to the invention with a call control level, a resource control level and two terminals for data transfer.

FIG. 1 shows an example of a configuration for implementing the invention, in the form of a communication network, with a call control level CCL, a resource control level RCL and two terminals A, B for data transfer. At both levels CCL, RCL secrets are used, in the form of symmetrical secrets $K_A$, $K_B$. Two tokens $T_A$, $T_B$ are also shown. Token TA (or TB) is provided here for the transfer from level CCL via the terminal A (or B) to level RCL encrypted with secret $K_A$ (or $K_B$).

Figure 2:
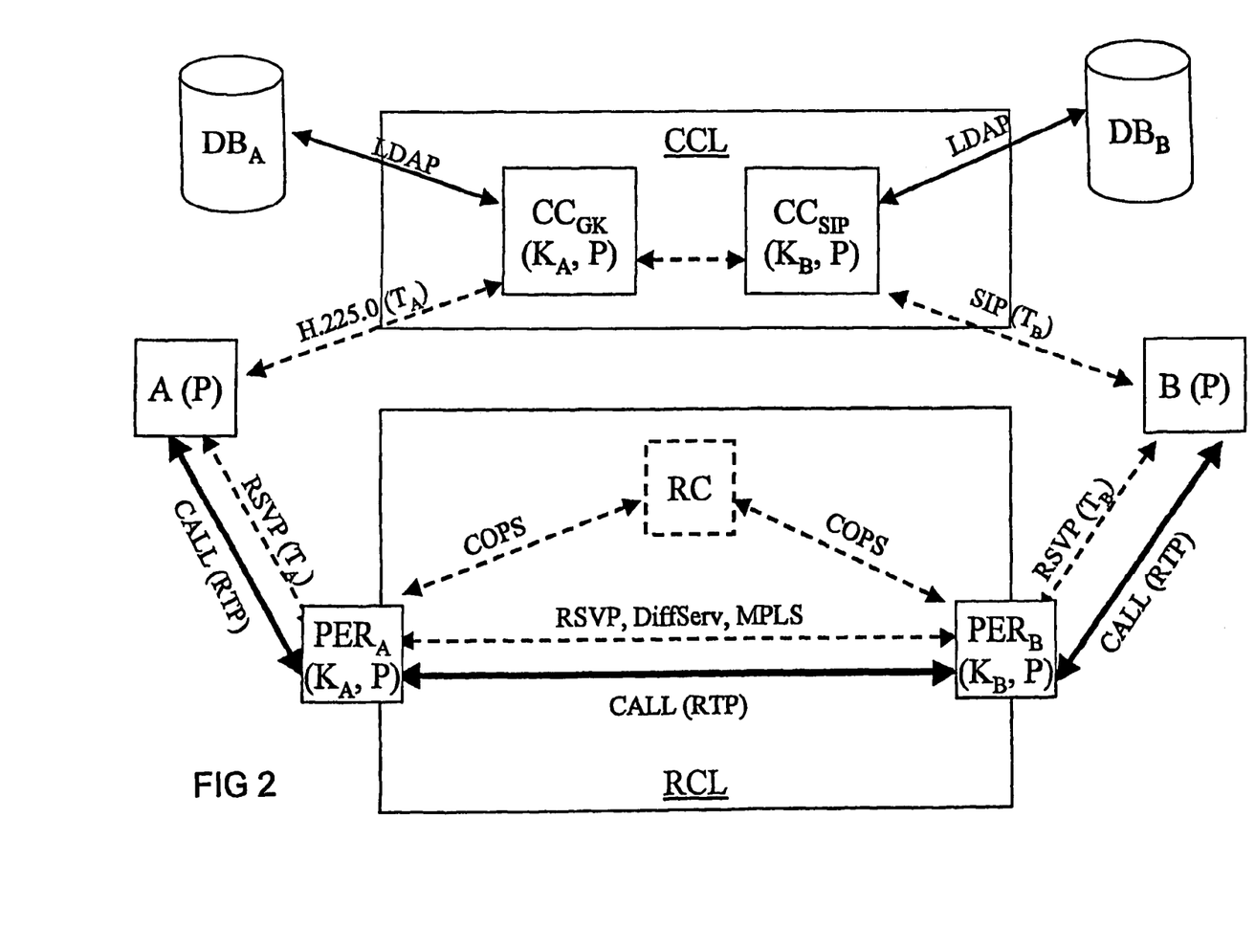
FIG. 2 an example of a detailed embodiment of the configuration according to FIG. 1 with programs to implement the method according to the invention FIG. 3 a flow chart, in which an embodiment of the method according to the invention is shown by way of example.

FIG. 2 shows a detailed embodiment of the configuration according to FIG. 1. It should be emphasized that the embodiments shown here, despite their partially true-to-detail representation, are given as examples and should not be seen as restrictive. In this embodiment, the CCL level includes two call controllers CC, with call controller CC assigned to terminal A in the form of gatekeeper $CC_{GK}$ and call controller CC assigned to terminal B in the form of SIP proxy CCSIP. The gatekeeper $CC_{GK}$ is assigned a user database $DB_A$ and the SIP proxy CCSIP a user database $DB_B$ to verify users and their entitlements, which can be accessed with the LDAP (Lightweight Directory Access Protocol) protocol, for example. The secret KA is provided in the gatekeeper $CC_{GK}$ and the secret KB in the SIP proxy CCSIP. Signaling messages are exchanged as necessary between the two call controllers CC. Level RCL includes a central resource controller RC. Two edge routers $PER_A$, $PER_B$ are assigned to this for the transfer of data in a communication network. The secret $K_A$ is provided in the edge router $PER_A$ and the secret $K_B$ in the edge router $PER_B$. A COPS (Common Open Policy Server) protocol operates between the resource controller RC and the edge routers PER. Also an H.225.0 protocol is used between the terminal A and the gatekeeper CCOK, an RSVP (Resource Reservation Protocol) protocol between the terminal A and the edge device $PER_A$ plus the terminal B and the edge device $PER_B$, and an SIP (Session Initiation Protocol) protocol between the terminal B and the SIP proxy $CC_{SIP}$. The tokens $T_A$, $T_B$ respectively are transferred in the standardized messages of the H.225.0, SIP, RSVP protocols. At least one of the RSVP, DiffServ or MPLS protocols is used between the edge devices $PER_A$ and $PER_B$. A call CALL is displayed between terminals A and B for the high quality execution of which a data transfer with a guaranteed QoS is required. The data is transferred in the communication network by means of an RTP (Realtime Protocol) protocol. The communication network is configured, for example, as an IP network. For the professional person skilled in the art it is clear that the invention can of course be used in other types of network, such as, for example, the internet, intranet, extranet, a local area network (LAN) or a corporate network in the form, for example, of a virtual private network (VPN). Computer program products P according to the invention are provided in the terminals A and B, the call controllers CC and the edge devices PER, each of which contains software code segments for the processor-based implementation of the method according to the invention. As an option, parts of the computer program products P can also operate on specialist hardware (e.g. crypto-processors).

Figure 3:
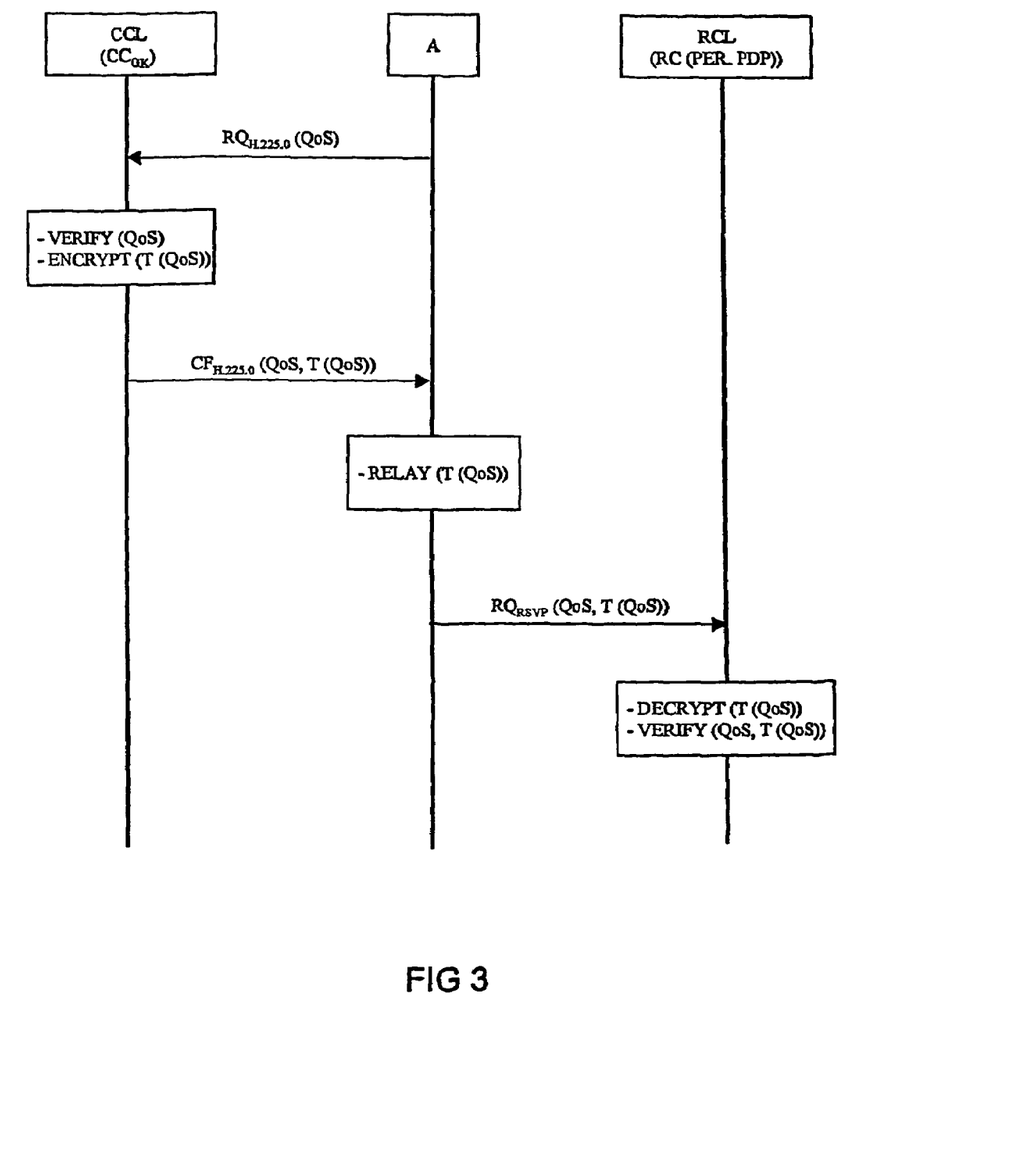

FIG. 3 shows an embodiment of the method according to the invention with an example of a rudimentary call set-up for a call CALL according to the H.323 standard family of the ITU using a flow chart. The diagram shows standardized (signaling) messages $RQ_{H.225.0}$, $CF_{H.225.0}$ for the exchange of signaling data between the terminal A and level CCL, and a (signaling) message RQRSVP to request a QoS from level RCL, which are to some extent modified so that the method according to the invention can be shown. The message RQRSVP is taken from the standard RSVP protocol, which was developed at the IETF for the transfer of resource and QoS requirements RQ between terminals A, B or from terminals A, B into the (IP) network.

We then used an example to show the behavior and interaction according to the invention of the gatekeeper $CC_{GK}$, the terminal A and the edge device $PER_A$. The data relevant to the invention is transferred in appropriately modified (signaling) H.225.0 and RSVP protocol messages. The person skilled in the art can see clearly that the call controller CC could be configured in any way, in particular even as an SIP proxy $CC_{SIP}$. This embodiment is suggested in FIG. 2 for terminal B.

First the terminal A is registered with the gatekeeper $CC_{GK}$. Registration is requested by the terminal A by means of an H.225.0 registration request RRQ and responded to by the gatekeeper $CC_{GK}$ with an H.225.0 registration confirmation RCF or an H.225.0 registration reject RRJ. A general QoS requirement RQ may already be included in the message RRQ, which should be generally valid for all subsequent calls CALL. The terminal A and where appropriate the QoS requirement RQ are then verified, in other words authenticated, authorized, etc. by the gatekeeper $CC_{GKo}$ For this purpose, user-specific data, which is stored, for example, in a database $DB_A$, is accessed using the LDAP protocol or another DB search protocol. This data can also include a maximum permitted QoS requirement RQ, which could be determined, for example, on the basis of the user's contract with its ISP. The permitted, current QoS requirement is now determined as required. This could then be transferred in the message RCF to the terminal A.

The gatekeeper $CC_{GK}$ also determines whether call signaling should be transferred by it (gatekeeper routed call signaling) or directly between the terminals A, B (direct endpoint call signaling), where appropriate notifying the gatekeeper $CC_{GK}$ of major changes. The terminals A, B should adhere to these decisions; if however it is decided to protect the communication network from misconduct at the terminal A, B, additional security mechanisms should be provided.

Once both terminals A, B have been registered, call signaling, in particular call set-up, is in principle possible between the two terminals A, B. This is initiated, for example, by terminal A, by requesting the setting up of a call CALL to terminal B from the gatekeeper $CC_{GK}$ by means of an H.225.0 admission request ARQ. Again this ARQ could include a QoS requirement RQ. The gatekeeper $CC_{GK}$ responds by carrying out authentication and authorization in respect of the call CALL. This also includes determination of the QoS requirement RQ. This may also be determined, for example, by means of a capability negotiation between the two terminals A, B by means of further H.225.0 messages. In the case of gatekeeper routed call signaling, the gatekeeper $CC_{GK}$ is notified of this immediately. In the case of direct endpoint call signaling notification of this may be given to the gatekeeper $CC_{GK}$. The determined QoS requirement RQ is verified by the gatekeeper $CC_{GK}$.

At least one token T encrypted using the secret $K_A$ is now created by the gatekeeper taking into account the verified QoS requirement RQ. User-related data (e.g. IP address, port number, etc.), for example, and all or a major part of the resource and QoS requirement data is input into this token T. According to a variant of the invention, data of variable value, e.g. random numbers or time stamps, is also taken into account when creating the token T. As an option, the billing process for the call CALL is started. The encrypted token T is transferred to the terminal A, for example in an H.225.0 ACF (admission confirmation) message. The token T transferred thus is taken from the ACF message in the terminal A and stored in an intermediate memory. The terminal B indicates acceptance of the call CALL with a CONNECT message to the gatekeeper $CC_{GK}$. The token T could be included by the gatekeeper $CC_{GK}$ in a CONNECT message, which is transferred by the gatekeeper GK to the terminal A to indicate the successful call set-up.

The encrypted token T is then incorporated by the terminal A in an otherwise unmodified standard RSVP QoS requirement RQ and transferred to the edge device $PER_A$. The encrypted token T is decrypted by the edge device $PER_A$ using the secret KA and then used to verify the correctness of the QoS requirement RQ. Unless coordination has taken place beforehand between the gatekeeper $CC_{GK}$ and the resource controller RC, further verification of the QoS requirement RQ is now carried out by the edge device. For this purpose, for example, a request is now sent via the standard COPS protocol to the resource controller RC. The latter verifies whether the requested QoS can be provided in the communication network. For this, the resource controller RC must only know all the available (or assigned) resources in the communication network, in order to be able to send a reply to the COPS request. The user's entitlement to the call CALL itself has already been determined by the gatekeeper $CC_{GK}$. With this variant no interface and no messages are necessary between the resource controller RC and the gatekeeper $CC_{GK}$ or between the resource controller RC and the (user) database $D_B$.

On receipt of the response of the resource controller RC the edge device $PER_A$ responds as follows: either the QoS requirement RQ is rejected due to overload in the communication network or due to failed verification taking into account the token T or the required QoS is set configuratively in the communication network, for example by dynamic activation of a policy or as an alternative to RSVP scheduling in the edge device $PER_A$ by forwarding the RSVP reservation through the network to the other edge device $PER_B$ or terminal B. However this is not relevant for the solution proposed here.

On receipt of a positive RSVP response from the edge device $PER_A$, the terminal A starts to transfer data. In doing so, the signaling data is transferred, for example, according to a realtime control protocol (R TCP) and the media data, for example, according to a realtime protocol (RTP). During the period of the call CALL the QoS is now guaranteed specifically for this call CALL, the users and according to the users' entitlements and to the load situation on the ISP's network.

To increase security further, a modified token T is repeatedly transferred to the terminal A. This takes place at regular intervals of a few seconds, for example. This has particularly good advantages, if existing messages can be used to transfer these tokens T. For example, during a call CALL the terminal A and the gatekeeper $CC_{GK}$ can remain permanently connected by means of regularly exchanged KeepAlive messages (see also H.225.0 (February 1998), ch. 7.9.1 and 7.9.2, timeToLive parameter in the registration confirm RCF message to set the duration of the registration period and keepAlive parameter in the registration request RRQ message to renew or in other words extend the period of an existing registration). Generally the period of these Keep Alive messages is regular and in a range of seconds. Encrypted tokens T can be transferred repeatedly in these messages, so that the terminal A repeatedly receives encrypted tokens T to renew "soft" reservations in the communication network.

A particularly high level of security is achieved by integrating data of variable value, e.g. random numbers and/or time stamps, in the encrypted tokens T. In doing so, advantageously, any renewal message can be encrypted or decrypted with the same secret K. If a time stamp is incorporated in the encrypted QoS requirement RQ, it is also ensured that the terminal A cannot delay or store the token T, to forward it at a later time. This excludes the possibility of collecting encrypted tokens T during the night, when low tariffs apply, and not using them until daytime at high tariffs.

Termination of the call CALL is indicated by a RELEASE message from the terminal A. As a result the gatekeeper $CC_{GK}$ ceases the dispatch of encrypted tokens T to terminal A and terminates the billing process for the call CALL started as an option. The edge device $PER_A$ then receives no further encrypted tokens T, so that after a short time the reservation in the communication network is cancelled. The resource controller RC can then reallocate the released resources.

The call controller $CC_{SIP}$ of terminal B is also notified of the termination of the call CALL by signaling. This call controller also ceases the dispatch of encrypted tokens $T_B$. All reservations in the communication network made by the terminal B for the call CALL are then also cancelled. In this way the call CALL is consistently terminated. Encryption and decryption of the token T is effected, for example, according to one or a combination of the decentralized mechanisms for the security of data transfers (for example configured according to the ITU standard H.225.0) as described in the ITU standard H.235v2, "Security and encryption for H-series (H.323 and other H.245-based) multimedia terminals", 2000, Annex D-F:

- Authentication and integrity with symmetrical secrets according to H.235, Annex D: A signature in the form of a cryptographic hash value is created over the entire (signaling) message by the sender using a secret and appended to the message on transfer. The hash value is decoded by the recipient using the same secret. The sender is then securely identified, if the hash value corresponds to the message after decoding. The secrets are in the form of passwords, stored in a central server. They are administered out-of-band in the sender and receiver.
- Authentication and integrity with asymmetrical secrets according to H.235, Annex E: A cryptographic, digital signature is created over the entire (signaling) message by the sender. Certificates are also used, which are transferred in-band or administered out-of-band. The private keys are administered manually in the terminals. Signing is currently a time intensive computing operation, which is not suitable for use in all data transfers because of realtime requirements. This basic condition may however become less important, as the performance of computer systems continues to improve.
- Authentication and integrity of signaling with hybrid secrets according to H.235, Annex F: A combination of the above two methods is used, with what is known as a session key also being exchanged using the Diffie-Hellman method. In this, the first message in any direction is signed digitally and all other messages are given symmetrical integrity protection. Certificates are also used, which are transferred in-band or administered out-of-band.
- Confidentiality of media data with symmetrical secrets according to H.235, Annex D based on the voice encryption profile (VEP): with this, a separate, joint key is negotiated to encrypt the media data by means of an authenticated Diffie-Hellman method between the terminals.

Particularly good advantages are offered, when the stages of the method according to the invention are implemented using already existing messages configured in this embodiment according to the H.323 standard family or the RSVP protocol, for example by incorporating data relevant to the invention in already existing or, if necessary, special message fields, which are provided in the relevant standards, for example, as free fields without a specified function (optional parameters).

For example, the terminal incorporates the encrypted token T into an otherwise unmodified RSVP reservation message $RQ_{RSVP}$ to resource control level RCL. This brings the NULL object of RSVP into play. The IETF standard RFC2205 describes this element as follows: "A NULL object has a Class-Num of zero, and its C-type is ignored. Its length must be at least 4, but can be any multiple of 4. A NULL object may appear anywhere in a sequence of objects, and its contents will be ignored by the receiver."

Alternatively, the encrypted token T is incorporated, for example, in the INTEGRITY field of standard RSVP messages. According to the IETF standard RFC2205, this field contains the following data: "Carries cryptographic data to authenticate the originating node and to verify the contents of this RSVP message". The term "originating node" (=(user) terminal) does not indicate that the encrypted token T is supplied by call control level CCL. It refers more to a coordinated encryption between the in itself autonomous terminal A, B and resource control level RCL.

Of course separate messages are also possible to transfer data relevant to the invention. As a further alternative both secrets $K_A$, $K_B$ can also be configured manually. This means that the use of an expensive Diffie-Hellman method DH for registering the terminals A, B is no longer necessary, at the cost of reduced flexibility of the configuration, which can be extremely useful and desirable in a correspondingly rigidly configured communication network. A corresponding embodiment of the method is shown in FIG. 3. In this, the secrets $K_A$, $K_B$ are preconfigured manually in the terminals A, B and the central unit C. Signaling relating to registration and call set-up is secured by the secrets $K_A$, $K_B$.

To conclude, it should be stressed that the description of the components of the communication network relevant to the invention should in principle not be seen as restrictive. For a professional person skilled in the art it is particularly clear that concepts such as "terminal", "call control level" or "resource control level" should be understood in the functional rather than physical sense. So, for example, the terminals A, B may also be partially or wholly distributed in software and/or over a number of physical devices.

The invention claimed is:

1. A method for transferring data with a verified QoS in a communication network, which includes a call control level, a resource control level and at least one terminal assigned to data transfer, comprising:
    determining a QoS requirement for data transfer and verified at call control level;
    creating and transferring, taking into account the QoS requirement verified at the call control level, at least one encrypted token to the terminal;
    transferring the verified QoS requirement and the encrypted token to the resource control level from the terminal;
    decrypting, at the resource control level, the encrypted token, and verifying the QoS requirement using the decrypted token; and
    configuring the communication network taking into account the QoS requirement verified, such that the data is transferred with the verified QoS.

2. The method according to claim 1, wherein the call control level repeatedly transfers the token to the terminal, which is forwarded from there to the resource control level.

3. The method according to claim 1, wherein data of variable value is incorporated in the encrypted token.

4. The method according to claim 1, wherein the encrypted token is transferred between the terminal and the call control level and/or between the terminal and the resource control level in existing signaling messages.

5. The method according to claim 1, wherein accounting for the data transfer is started by the call control level on successful verification of the QoS requirement.

6. The method according to claim 5, wherein accounting and the transfer of encrypted tokens to the terminal is terminated by the call control level after completion of the data transfer.

7. The method according to claim 1, wherein encryption and decryption are carried out using a symmetrical secret.

8. A computer readable medium storing a computer program, which is executable by a processor, comprising:
    determining a QoS requirement for data transfer and verified at a call control level;
    creating and transferring, taking into account the QoS requirement verified at the call control level, at least one encrypted token to the terminal;
    transferring the verified QoS requirement and the encrypted token to a resource control level from the terminal;
    decrypting, at the resource control level, the encrypted token, and verifying the QoS requirement using the decrypted token; and
    configuring the communication network taking into account the QoS requirement verified, such that the data is transferred with the verified QoS.

9. The method according to claim 1, wherein the at least one terminal comprises means for implementing the method.

10. A system for transferring data with a verified QoS in a communication network, which includes a call control level, a resource control level and at least one terminal assigned to data transfer, comprising:
    determining a QoS requirement for data transfer and verified at the call control level;
    creating and transferring, taking into account the QoS requirement verified at the call control level, at least one encrypted token to the terminal;
    transferring the verified QoS requirement and the encrypted token to the resource control level from the terminal;
    decrypting, at the resource control level, the encrypted token, and verifying the QoS requirement using the decrypted token; and
    configuring the communication network taking into account the QoS requirement verified, such that the data is transferred with the verified QoS.

11. A method for transmission of information with a verified QoS in a communications network, having a QoS request, a Call Control Level for verifying whether a QoS request may be issued, a Resource Control Level for configuration of the network such that the information can be transmitted in the network with the requested QoS, a functional separation of the call and resource control levels, and at least one end point assigned to the transmission of information, comprising:

determining the QoS request for transmission of information;
in the Call Control Level:
  verifying whether the QoS request may be issued;
  forming at least one encoded token while considering the verified QoS request;
  transmitting the token to the end point;
from the end point:
  transmitting the verified QoS and the encoded token to the Resource Control Level;
in the Resource Control Level:
  decoding the token;
  checking correctness of the verified QoS request using the decoded token;
  configuring the communications network while considering the checked QoS request, such that the information is transmitted with the verified QoS.

12. A computer readable medium storing a computer program for transmission of information with a verified QoS in a communications network, having a QoS request, a Call Control Level for verifying whether a QoS request may be issued, a Resource Control Level for configuration of the network such that the information can be transmitted in the network with the requested QoS, a functional separation of the call and resource control levels, and at least one end point assigned to the transmission of information, the computer program having a program to execute the following:
  determining the QoS request for transmission of information;
  in the Call Control Level:
    verifying whether the QoS request may be issued;
    forming at least one encoded token while considering the verified QoS request;
    transmitting the token to the end point;
  from the end point:
    transmitting the verified QoS and the encoded token to the Resource Control Level;
  in the Resource Control Level:
    decoding the token;
    checking correctness of the verified QoS request using the decoded token;
    configuring the communications network while considering the checked QoS request, such that the information is transmitted with the verified QoS.

* * * * *